US007613121B2

(12) United States Patent
Chou et al.

(10) Patent No.: US 7,613,121 B2
(45) Date of Patent: Nov. 3, 2009

(54) METHOD AND SYSTEM FOR FACILIATING DATA ROUTING IN A CONGESTED NETWORK

(75) Inventors: Philip A. Chou, Bellevue, WA (US); Kamal Jain, Bellevue, WA (US); Dinesh Garg, Beawar (IN)

(73) Assignee: Microsoft Corporation, Redmond, WA (US)

( * ) Notice: Subject to any disclaimer, the term of this patent is extended or adjusted under 35 U.S.C. 154(b) by 559 days.

(21) Appl. No.: 11/363,801

(22) Filed: Feb. 28, 2006

(65) Prior Publication Data

US 2007/0201371 A1    Aug. 30, 2007

(51) Int. Cl.
*G01R 31/08* (2006.01)
(52) U.S. Cl. .................. 370/237; 370/235; 370/231
(58) Field of Classification Search ............. 370/351, 370/360, 398, 389, 395.1, 395.2, 395.21, 370/229, 230, 230.1, 231, 232, 233, 234, 370/235, 235.1, 236, 236.1, 236.2, 237, 238, 370/238.1; 379/1.01, 9, 15.01, 16
See application file for complete search history.

(56) References Cited

U.S. PATENT DOCUMENTS

2004/0219922 A1* 11/2004 Gage et al. .................. 455/445
2006/0187874 A1*  8/2006 Zaki ........................... 370/328
2007/0147255 A1*  6/2007 Oyman ....................... 370/238

OTHER PUBLICATIONS

Desmond S. Lun, et al., Network Coding With A Cost Criterion, International Symposium on Information Theory and its Applications, ISITA2004, Parma, Italy, Oct. 10-13, 2004.
Y. Wu, et al., "Distributed Utility Maximization For Network Coding Based Multicasting: A Shortest Path Approach," IEEE J. Selected Areas in Communications, Sep. 2005, submitted.
C. Jin, et al., "FAST TCP: motivation, architecture, algorithms, performance," Tech. Rep. CaltechCSTR:2003.010, Caltech, Pasadena CA, 2003, http://netlab.caltech.edu/FAST.
Frank P. Kelly, et al., "Rate control for communication networks: Shadow prices, proportional fairness and stability," Journal of Operations Research Society, vol. 49, No. 3, pp. 237-252, Mar. 1998.

* cited by examiner

*Primary Examiner*—Chi H Pham
*Assistant Examiner*—Fan Ng
(74) *Attorney, Agent, or Firm*—Lee & Hayes, PLLC (57) ABSTRACT

Congestion adaptive data routing is leveraged to provide a substantial increase in data throughput in networks with data congestion. By continuously adapting the data routes when a congested route is encountered, the data can reach its destination via alternate routes around the congested area. This is accomplished in a distributed manner where each node provides an alternative path to congestion based on its local knowledge and/or knowledge obtained from neighboring nodes. This allows the data path to be dynamically adjusted for congestion without requiring a centralized body of control. In another instance, data rate changes can be combined with data path changes to increase the efficiency of the data throughput. Alternative routes can be determined based upon the costs associated with selecting that route. Selecting a minimum cost route yields the most efficient transfer of data.

16 Claims, 10 Drawing Sheets

METHOD AND SYSTEM FOR FACILITATING DATA ROUTING IN A CONGESTED NETWORK

BACKGROUND

In previous times, information was communicated from point A to point B via a messenger who would travel from place to place, typically carrying a written document. As times progressed, new communication methods were invented and other forms of communications came into existence. Instead of being forced to utilize written documents, the information could now be digitized into 1's and 0's and electrically sent over wires. Subsequently, wireless communications added another dimension to transmitting data, eliminating electrical wiring as a necessity. This form of communications advanced to a level that now information can be beamed up to satellites that orbit the earth and transmitted down nearly half way around the globe in less than a second. Thus, not only has data transmission become easier, but it has also become substantially faster. Larger quantities of data are now being sent than ever before. This is largely due to the fact that more people have easier access to conveniently transmit data, leading to increased occurrences of data congestion. Data congestion generally occurs when more data is trying to be transmitted than the medium for the transmission is capable of transmitting. This causes a backlog of data waiting to be sent. This is especially prevalent in modern computing networks.

These computer networks are comprised of nodes that route data packets through links between a data source, or sender (e.g., a server computer) and a data destination, or receiver (e.g., a client). Successful routing of data packets requires that a logical path (e.g., a sequence of one or more links) exists in the network between the source and destination. In general, a network possesses physical redundancy (e.g., multiple paths to a destination) in case of node and/or link failure. However, conventionally, data packets from a given source to a given destination follow a unique path through the network determined by routing tables maintained at each of the intermediate network nodes.

Frequently, a particular route will become congested with traffic, drastically increasing data latency. A source can adjust for this congestion by varying the rate that it sends data over the congested route. This tends to alleviate some of the congestion but at the price of decreasing data throughput (since data packets are sent at a slower rate). Thus, conventionally, throughput is reduced if data is forced to travel through a congested route.

The situation is analogous to using a fleet of trucks to carry a continuous supply of goods from a warehouse to an outlet along a route through downtown. Assuming the fleet of trucks is finite, each truck must return to the warehouse to get refilled. Thus, when downtown traffic congests the route, it takes longer for each truck to get through, thereby reducing the rate of delivery of goods. On the other hand, if it were possible for the trucks to route around downtown during periods of congestion, then the delivery rate would be less impacted.

SUMMARY

The following presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description that is presented later.

The subject matter relates generally to network data transmission, and more particularly to systems and methods for increasing the efficiency of data transfers through a network. Congestion adaptive data routing is leveraged to provide a substantial increase in data throughput in networks with data congestion. By continuously adapting the data route when a congested route is encountered, the data can reach its destination via alternate routes around the congested areas. This is accomplished in a distributed manner where each node provides an alternative path to congestion based on its local knowledge and/or knowledge obtained from neighboring nodes. This allows the data path to be dynamically adjusted for congestion without requiring a centralized body of control. In another instance, data rate changes can be combined with data path changes to increase the efficiency of the data throughput. This allows the technique to be employed with existing congestion reducing techniques, enhancing the efficiencies of existing data routing systems. Alternative routes can be determined based upon the costs associated with selecting that route. Selecting a minimum cost route yields the most efficient transfer of data.

To the accomplishment of the foregoing and related ends, certain illustrative aspects of embodiments are described herein in connection with the following description and the annexed drawings. These aspects are indicative, however, of but a few of the various ways in which the principles of the subject matter may be employed, and the subject matter is intended to include all such aspects and their equivalents. Other advantages and novel features of the subject matter may become apparent from the following detailed description when considered in conjunction with the drawings.

DETAILED DESCRIPTION

The subject matter is now described with reference to the drawings, wherein like reference numerals are used to refer to like elements throughout. In the following description, for purposes of explanation, numerous specific details are set forth in order to provide a thorough understanding of the subject matter. It may be evident, however, that subject matter embodiments may be practiced without these specific details. In other instances, well-known structures and devices are shown in block diagram form in order to facilitate describing the embodiments.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a computer component. One or more components may reside within a process and/or thread of execution and a component may be localized on one computer and/or distributed between two or more computers.

In computer networks, data packets are routed from a sender to a receiver along a fixed path, according to pre-established routing tables in each network node. Protocols such as Transmission Control Protocol (TCP) send data packets along this fixed path at a rate that varies dynamically according to congestion on the links in the path. If some link in the path is experiencing congestion, then TCP reduces the rate at which it sends packets along the fixed path, until the congestion is alleviated. In sharp contrast, instances of the systems and methods herein facilitate in transmitting data by providing a data route that can vary dynamically according to congestion, thereby allowing data packets to route dynamically around congested links, rather than simply reducing a data rate on a congested link. This is accomplished in a distributed way with minimal extra communication between network nodes.

Figure 1:
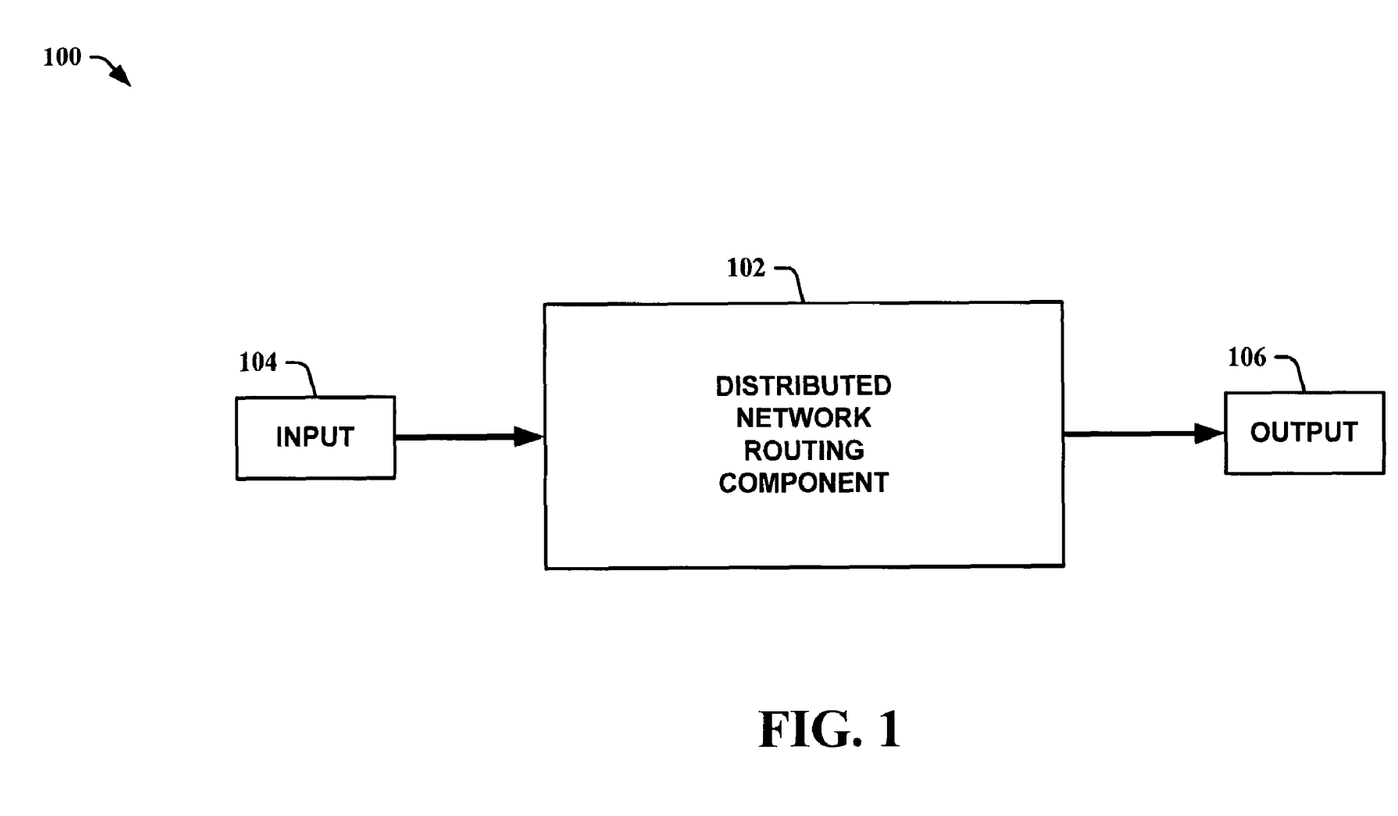
FIG. 1 is a block diagram of a distributed network routing system in accordance with an aspect of an embodiment.

In FIG. 1, a block diagram of a distributed network routing system 100 in accordance with an aspect of an embodiment is shown. The distributed network routing system 100 is comprised of a distributed network routing component 102 that receives an input 104 and provides an output 106. The input 104 is typically data that is obtained from an entity that is part of a network. The entity can be, for example, the originating node of the data and/or a network node that is relaying the transmitted data through a link in the network (i.e., an intermediate node). The distributed network routing component 102 receives the input 104 and dynamically determines how the data is transmitted from a node in which the distributed network routing component 102 resides. The distributed network routing component 102 determines the appropriate transmission technique based on, at least in part, data congestion information obtained directly by the distributed network routing component 102 and/or data congestion information obtained from neighboring network nodes with other distributed network routing components.

The output 106 represents dynamic adaptations of route and/or rate adjustments in regard to the congestion information. The distributed network routing component 102 provides better use of network resources and/or higher throughput around congestion in a distributed manner. By distributing the route and/or rate adaptations, no single or "master" entity is required to maintain and/or derive a complete data route/rate for transmitting from an originator to an end user. Thus, the distributed network routing component 102 can react substantially faster to changes in local data congestion and does not have to wait for a response from a master entity when adaptations are required. Additionally, congestion information is shared locally and is not required to be transmitted to nodes beyond neighboring nodes (which would require additional relaying of information from each node). Therefore, dynamic adaptations can be provided with minimal communication between nodes.

The distributed network routing component 102 employs cost (or price) parameters to facilitate in determining an optimal transmission for the input 104. Various cost parameters (discussed infra) such as minimal cost, average cost, and/or maximum cost can be employed to facilitate in selecting an optimal transmission technique. The transmission techniques can provide for congestion adaptive routes and/or congestion adaptive data rates. In general, a determined minimal cost based on adaptations for route and rate yield the optimal data transmission. These techniques are continuously adaptive and can adapt to its own traffic caused by re-routing around a congested area. A distributed network routing component 102 can include, but is not limited to, utilization with a source node, an intermediate network node, an IP (Internet Protocol) router, and/or a router an application level and the like.

The distributed network routing system 100 can be built on different levels of network abstraction such as, for example, at a fairly high level (e.g., at an application level and/or network overlay level where logical nodes are actually end hosts). These high levels can be comprised of computers that utilize an underlying network (e.g., the Internet). Thus, a collection of computers where each computer is one of the nodes of the network and each computer can talk to some subset of other computers directly via the underlying network. Each computer can run a congestion adaptive routing program to facilitate in recognizing congestion directly and/or from its neighbors. For example, a node might have five neighbors out of a possible 1,000 nodes in a network. Various pairs of nodes in this thousand node network can determine if it is beneficial to communicate data to each other by querying their neighbors and asking (or obtaining) them for cost/latency information to transmit the data from one node to a desired neighboring node. Each time a rate of communication increases, the increase is accomplished through the lowest cost/lowest delay path or neighbor.

The distributed network routing component 102 can also be utilized to substantially increase network efficiency where transmission means are mobile and changes that promote congestion are highly likely. For example, with wireless communications devices with short ranges. Radio communication devices can become nodes to relay data transmissions for long distances. As radio users move around they tend to often congregate in one area, creating increased data congestion. These areas can be dynamically avoided by hopping through other multiple units to get to a final destination. Thus, by employing techniques described herein "distributed communication systems" can be created that have an increased level of reliability and increased network efficiency for transmitting data. This is extremely beneficial in undeveloped areas of the world where radio communications may be the only communication means available.

Figure 2:
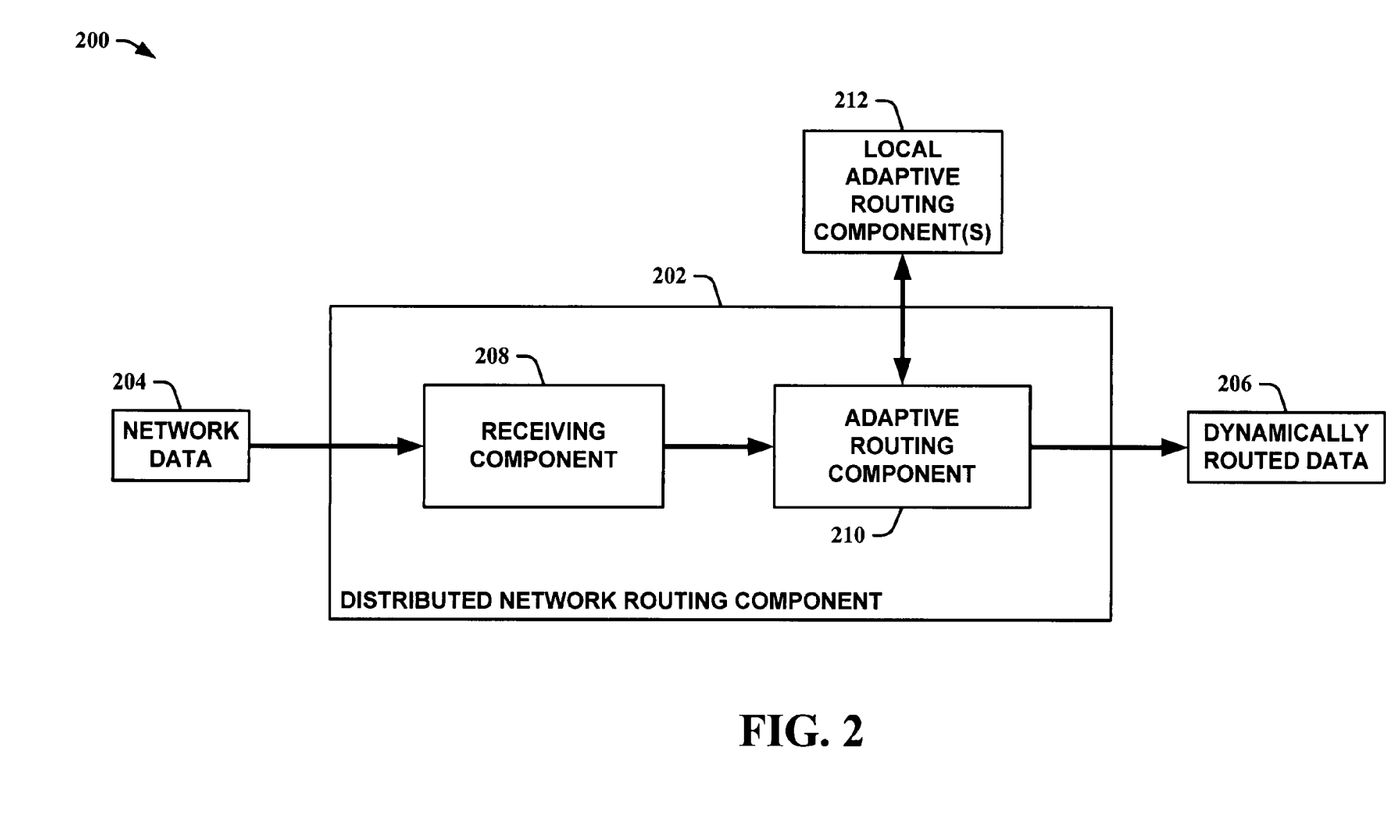
FIG. 2 is another block diagram of a distributed network routing system in accordance with an aspect of an embodiment.

Turning to FIG. 2, another block diagram of a distributed network routing system 200 in accordance with an aspect of an embodiment is illustrated. The distributed network routing system 200 is comprised of a distributed network routing component 202 that receives network data 204 and provides dynamically routed data 206. The distributed network routing component 202 is comprised of a receiving component 208 and an adaptive routing component 210. The receiving component 208 obtains the network data 204 from an originating source node and/or an intermediate node and the like. The receiving component 208 then relays the network data 204 to the adaptive routing component 210. The adaptive routing component 210 obtains network data congestion information from local adaptive routing component(s) 212 and/or obtains network data congestion information directly from its environment. The adaptive routing component 210 determines an optimal transmission for the network data 204 based on, at least in part, the network data congestion information it has obtained. The adaptive routing component 210 then provides the dynamically routed data 206 that optimizes the data transmission of the network data 204. In another instance, the adaptive routing component 210 can adapt the rate of the dynamically routed data 206 based on the congestion information as well. This allows the network data 204 to be transmitted utilizing the optimal route at an optimal rate to maximize use of network resources and reduce the cost of transmitting the data through the network.

Figure 3:
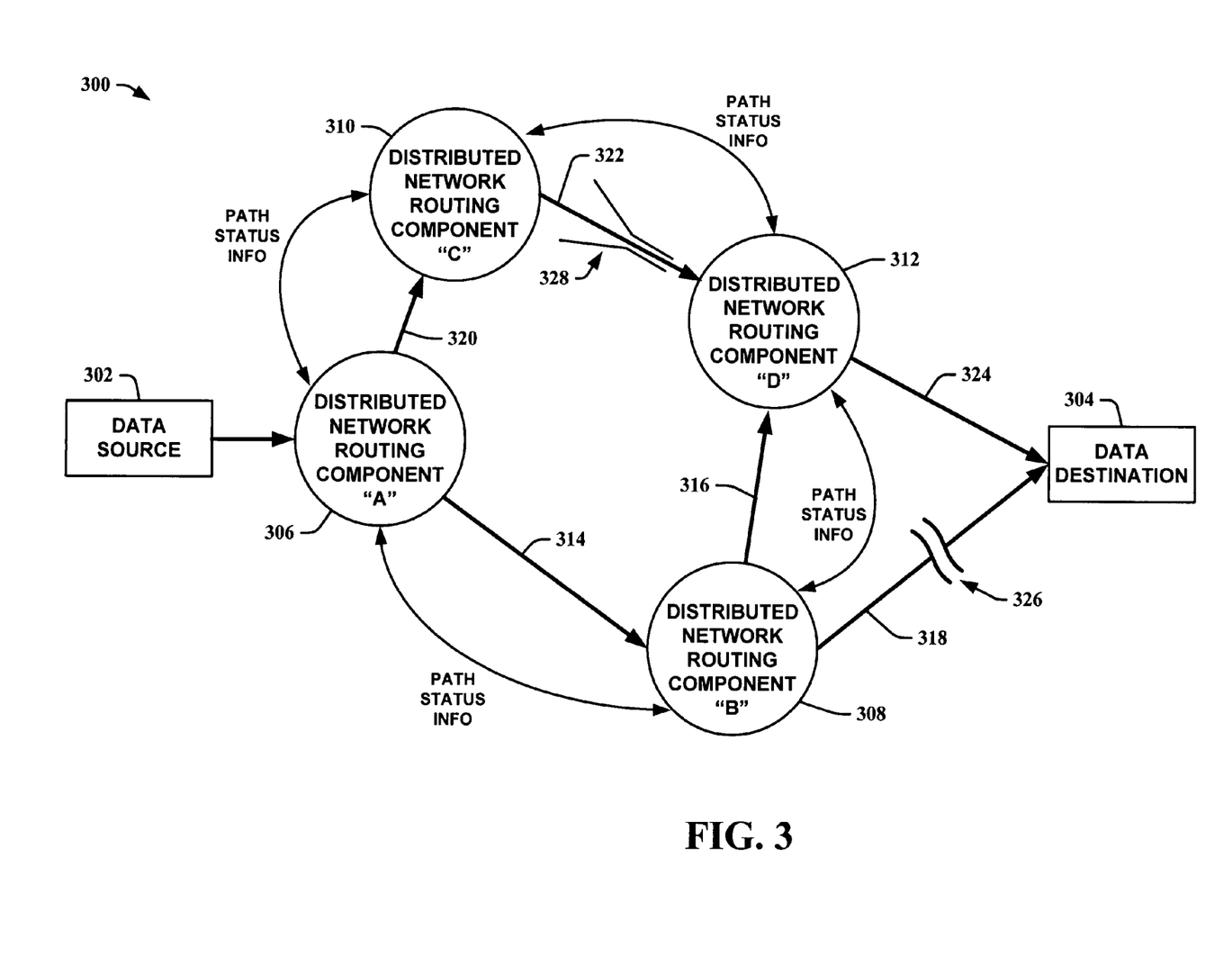
FIG. 3 is an illustration of an example data flow through a network that employs a distributed network routing system in accordance with an aspect of an embodiment.

Looking at FIG. 3, an illustration of an example data flow 300 through a network that employs a distributed network routing system in accordance with an aspect of an embodiment is depicted. The data flow 300 represents a flow from a data source 302 to a data destination 304 (the receiver). The "network" in this example includes further nodes with distributed network routing components, namely distributed network routing components "A-D" 306-312 with data links or "paths" 314-320. The data source 302 can be co-located with distributed network routing component "A" 306, in which case distributed network routing component "A" is considered the sender. Note that not all distributed network routing components "A-D" 306-312 are directly connected.

When the distributed network routing component "A" 306 receives network data from the data source 302, it 306 determines a data route and/or data rate based on congestion information obtained directly and/or from its neighbors, distributed network routing component "B" 308 and distributed network routing component "C" 310. For example, distributed network routing component "A" knows that its local links 314, 320 have low queuing delay and, thus, are clear of any congestion. It 306 learns from distributed network routing component "C" 310 that the delay of the route between it 310 and the data destination 304 is moderately high. The cause of this delay is congestion 328 on link 322, though this fact need not be specifically communicated to distributed network routing component "A" 306. Distributed network routing component "A" 306 also learns from distributed network routing component "B" 308 that it 308 has a low delay route to the destination 304. This low delay route comprises links 316, 324. There is also a high delay route 318, which is undergoing severe congestion 326, though these facts need not be specifically communicated to distributed network routing component "A" 306. Thus, distributed network routing component "A" 306 determines that it can avoid congestion by sending the network data to distributed network routing component "B" 308. Distributed network routing component "B" 308 has a blocked path 318 and, thus, transmits the network data to distributed network routing component "D" 312 with a clear path 324 to the data receiver 304.

In another example assuming that paths 314 and 316 represent severely congested links, distributed network routing component "A" 306 can determine that sending the network data to distributed network routing component "C" 310 will ultimately have lower delay, even though it must be routed through the moderate congestion 328 on link 322. In this case, the data source 302 can also reduce the rate of transmission to accommodate the moderate congestion 328 on link 322. By allowing both route and rate adaptations, the most cost effective means of transmitting the data can be found, thus, optimizing the networks resources and maximizing its data throughput around congestion.

Other mechanisms previously proposed for adaptive routing employ substantially complex algorithms unlike the techniques presented herein. For example, Lun et al. (see, D. S. Lun, M. Médard, T. Ho, and R. Koetter, Network coding with a cost criterion, In *Proc.* 2004 *International Symposium on Information Theory and its Applications* (ISITA 2004), October 2004) propose using an $O(N^3)$ algorithm to repeatedly solve a Minimum Cost Flow problem. In sharp contrast, instances of the systems and methods herein utilize a simple $O(N)$ algorithm to repeatedly solve a Shortest Path problem.

In another mechanism, proposed by Wu, Chiang, and Kung (see, Y. Wu, M. Chiang, and S. -Y. Kung, Distributed utility maximization for network coding based multicasting: a critical cut approach, submitted to *IEEE INFOCOM* 2006 in July 2005), that uses a Shortest Path algorithm, however, the mechanism also needs to know or infer the functional relationship between flow and cost on a link. In sharp contrast, instances of the systems and methods herein measure the current end-to-end cost (such as delay) for a path and adapts without having to infer any functional relationships between cost and flow.

Figure 4:
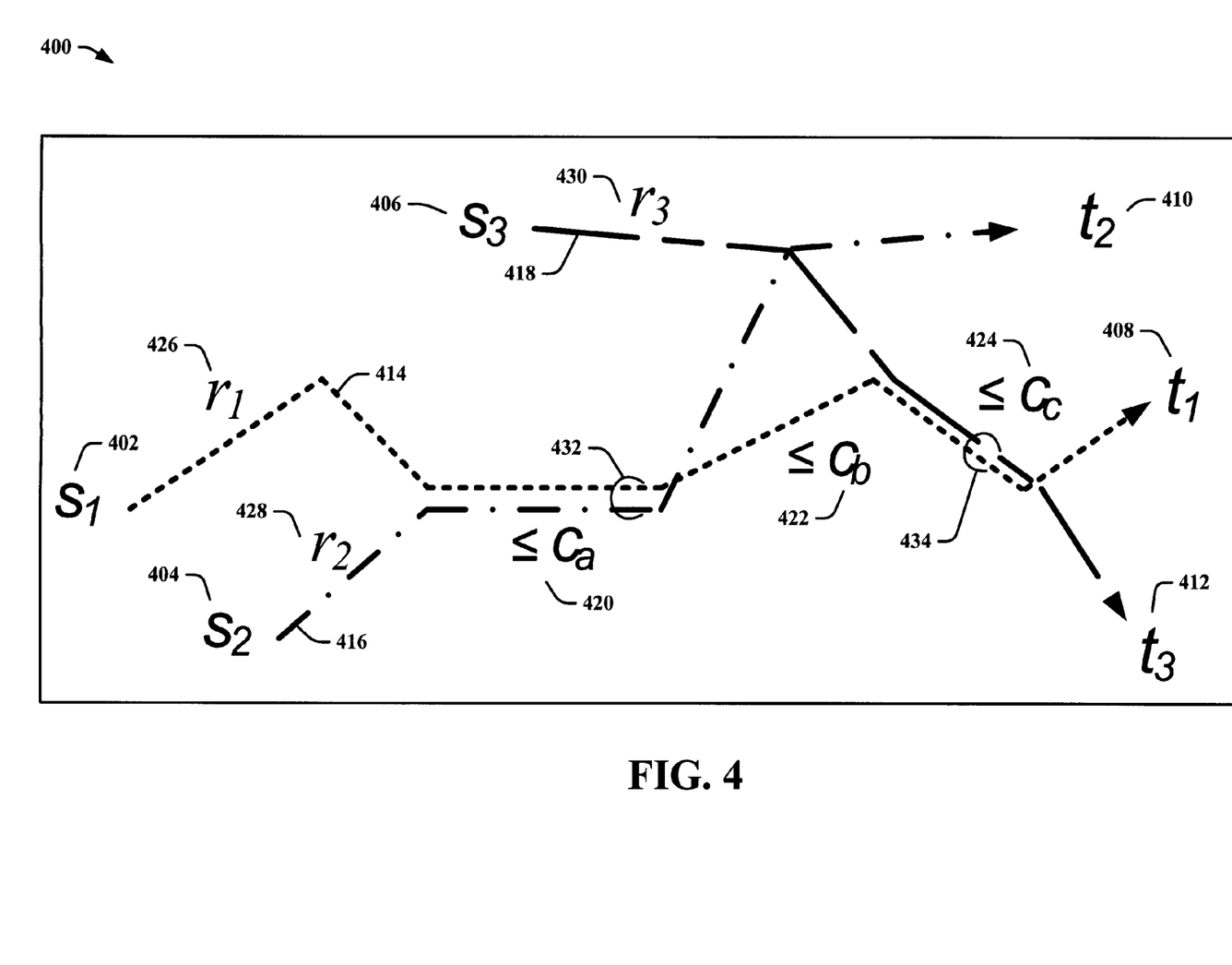
FIG. 4 is an illustration of communicating between pairs of senders and receivers in a network over shared links with capacity constraints in accordance with an aspect of an embodiment.

The seminal work, *Rate control for communication networks: shadow prices, proportional fairness and stability* (J. Operational Research Society, 1998), by Kelly, Maulloo, and Tan, considers the problem of communicating between pairs of senders and receivers in a network over shared links with capacity constraints. FIG. 4 is an illustration 400 of communicating between pairs of senders 402-406 and receivers 408-412 in a network over shared links with capacity constraints 420-424. In FIG. 4, sender $S_k$ 402-406 sends data to receiver $t_k$ 408-412 over paths 414-418 at rate $r_k$, for k=1, 2, 3 426-430. The paths 414-418 have some links 432-434 in common. The sum of the rates 426-430 of the paths 414-418 crossing any link must be at most the capacity 420-424 of the link. For example, in FIG. 4, $r_1+r_2 \leq c_a$, $r_1 \leq c_b$, and $r_1+r_3 \leq c_c$. Also, the rates 426-430 must be non-negative. These constraints on the rates 426-430 can be expressed by the vector inequalities $Ar \leq c$ and $r \geq 0$, where r is a column vector whose length is the number of sessions $N_S$, c is a column vector whose length is the number of links $N_L$, and $A=[a_{lk}]$ is a $N_L \times N_S$ routing matrix in which entry $a_{lk}$ equals 1 if the path for session k traverses link l, and equals 0 otherwise. Subject to these constraints, Kelly et al. attempt to maximize the weighted global utility $$\sum_k w_k U(r_k),$$

where $w_k$ is a weight for session k, and $U(r_k)$ is the utility of session k as a function of its rate. Kelly et al. convert this constrained optimization problem into an unconstrained optimization problem, maximizing $$\sum_k w_k U(r_k) - p'(Ar-c)$$

over both the length $N_S$ vector r and a length $N_L$ vector p (whose transpose is denoted p'). The vector p is a non-negative Lagrange multiplier, each of whose elements can be considered a price $p_l$ per unit flow on link l. If the l th component of the vector (Ar-c) is less than zero, meaning that the capacity constraint on link l is satisfied, then the price $p_l$ is zero, otherwise the price is increasingly positive, to reduce the demand on the link and hence drive the constraint towards satisfaction.

To solve the unconstrained optimization problem, Kelly et al. propose two algorithms. Their "primal" algorithm, $$\dot{r}_k = \kappa \left( w_k - r_k \sum_{l \in k} p_l \right), \quad \text{(Eq. 1)}$$

$$p_l = q_l \left( \sum_{k \in l} r_k \right)$$

changes the rate of each session k over time in proportion to the difference between the budget $w_k$ and the amount spent $$r_k \sum_{l \in k} p_l$$

(which is the number of units $r_k$ of flow bought times the total price $$\sum_{l \in k} p_l$$

per unit flow charged by the links along the path in session k), and it assigns the price of each link l to some convex cost $q_l(\bullet)$ as a function of the total rate $$\sum_{k \in l} r_k$$

flowing across the link. Their "dual" algorithm, $$\dot{p}_l = \kappa \left( \sum_{k \in l} r_k - q_l^{-1}(p_l) \right), \quad \text{(Eq. 2)}$$

$$\dot{r}_k = w_k \Big/ \sum_{l \in k} p_l$$

changes the price of each link l over time in proportion to the difference between the total rate $$\sum_{k \in l} r_k$$

flowing across the link and the rate $q_l^{-1}(p_l)$ that would induce price $p_l$ according to the convex cost function $q_l(\bullet)$, and it assigns the rate of each session k to the budget $w_k$ divided by the total price $$\sum_{l \in k} p_l$$

per unit flow charged by the links along the path in session k. In discretized form, the rate and price update equations would be:

$$r_k(t + \Delta) = r_k(t) + \kappa \Delta \left( w_k - r_k \sum_{l \in k} p_l(t) \right), \text{ and} \quad \text{(Eq. 3)}$$

$$p_l(t + \Delta) = p_l(t) + \kappa \Delta \left( \sum_{k \in l} r_k - q_l^{-1}(p_l(t)) \right). \quad \text{(Eq. 4)}$$

The work, *Fast TCP: Motivation, Architecture, Algorithms, Performance* (IEEE Infocom, March 2004), by Jin, Wei, and Low, and previous works by Low et al., give practical interpretations of the work of Kelly et aL by interpreting the price of a link as the queuing delay on the link, interpreting the cost of a path (i.e., the flow on a path times the total price along the path) as the amount of a session's data in the network, and a session's budget as the amount of data it is willing to have in the network. Jin, Wei, and Low show that the congestion control mechanism in TCP is essentially an "additive increase, multiplicative decrease" form of the rate change Eq. 3 above. In a TCP session, after each time step (i.e., after each arrival of an acknowledgement to the sender), the sender adds to its rate a constant amount if there is no congestion (i.e., no packet loss indicated by a duplicate acknowledgement), or else removes a constant fraction of its rate if there is congestion:

$$r_k(t + \Delta) = r_k(t) + \Delta \begin{cases} \kappa & \text{if no congestion} \\ -\alpha r_k(t) & \text{if congestion} \end{cases}. \quad \text{(Eq. 5)}$$

Furthermore, the price update equation for each link is computed by the network itself, since the price of a link at any point in time is equal to the length of its queue. This can be closely modeled by the change in level of a leaky bucket over a time step $\Delta$, where the leaky bucket has incoming flow rate $$\sum_{k \in l} r_k$$

and leak rate $c_l$:

$$p_l(t + \Delta) = p_l(t) + \Delta \left( \sum_{k \in l} r_k - c_l \right) \Big/ c_l. \quad \text{(Eq. 6)}$$

Note that even at equilibrium, TCP will continually increase and decrease its rate by small quantities as it seeks to adapt to congestion.

Instances of the systems and methods herein allow adaptation of the paths as well as the rates to congestion. In each session, whenever the sender increases its rate, it adds this rate along the cheapest (lowest delay) path between the sender and the receiver. And whenever the sender decreases its rate, it removes this rate along the most expensive (longest delay) path already carrying data between the sender and the receiver. The formula for increasing and decreasing rate is arbitrary and can be a rate update equation such as Eq. 3 or Eq. 5 above.

In order to efficiently find the least and most expensive paths in a distributed manner, each network node maintains, for each active session, the price of the least expensive path (among all paths) from the node to the receiver, and the price of the most expensive path (among all paths already carrying data) from the node to the receiver. Each node can also maintain for each active session an average price of the paths already carrying data from a node to a receiver. The average price, naturally, is bracketed between the minimum and maximum prices. The average price can be used in a rate update equation as described below.

The minimum, maximum, and average prices at a node i can be computed as follows, given the minimum, maximum, and average prices advertised by each of its neighbors j. In these expressions, $p_{ij}$ is the price (e.g., queuing delay) of the link carrying data from node i to node j, and $r_{ij}^k$ is the rate on the link carrying data from node i to node j for session k.

$$\min p_i^k = \min_j \{p_{ij} + \min p_j^k\}, \quad \text{(Eq. 7)}$$

$$avg p_i^k = \sum_j (p_{ij} + avg p_j^k) r_{ij}^k \Big/ \sum_j r_{ij}^k, \text{ and} \quad \text{(Eq. 8)}$$

$$\max p_i^k = \max_j \{p_{ij} + \max p_j^k\}. \quad \text{(Eq. 9)}$$

Note that in Eq. 7, the minimum is taken over all neighbors j of i, while in Eq. 9, the maximum is taken over all neighbors j of i for which $r_{ij}^k > 0$. Each node periodically performs these calculations at a pre-defined frequency (in an asynchronous manner with respect to the other nodes)—using the minimum, average, and maximum prices recently advertised by its neighbors, as well as the prices $p_{ij}$ (e.g., queuing delays) measured on the links to its neighbors—and subsequently the node advertises its newly computed minimum, average, and maximum prices to each of its neighbors. After a number of iterations equal to the diameter of the network, the prices stabilize and therefore adapt to any new level of congestion. The calculations are performed in a completely distributed way. That is, the computations are performed identically and asynchronously at the nodes using only local information obtained either from its immediate neighbors or from direct measurement of a characteristic (e.g., queuing delay) of its incident links.

Although any rate update equation can suffice, a scheme that attempts to maintain each session's budget (e.g., the number of the packets that the session budgets to be on-the-fly in the network) is the following:

If $$w_k > \sum_j (p_{ij} + avg p_j^k) r_{ij}^k$$

(i.e., if the cost of the session is below its budget) then increase the rate of flow to the cheapest neighbor $j^* = \arg\min_j p_j^k$:

$$r_{ij*}^k(t + \Delta) = r_{ij*}^k(t) + \max\left\{M, \frac{w_k - \sum_j (p_{ij} + avg p_j^k) r_{ij}^k(t)}{(p_{ij*} + \min p_{j*}^k)}\right\}, \quad \text{(Eq. 10)}$$

else decrease the rate of flow to the costliest neighbor $j^* = \arg\max_j p_j^k$:

$$r_{ij*}^k(t + \Delta) = r_{ij*}^k(t) - \min\left\{r_{ij}^k(t), \frac{\sum_j (p_{ij} + avg p_j^k) r_{ij}^k(t) - w_k}{(p_{ij*} + \max p_{j*}^k)}\right\}. \quad \text{(Eq. 11)}$$

Here, M is the maximum allowable increase in rate. This rate updating scheme will be invoked only by all the source nodes of the networks (not the intermediate nodes) with certain predefined frequency and in an asynchronous manner. Thus, the data flow rate will be adjusted only by the source nodes. However, the flow paths will be adjusted by all the intermediate nodes of the networks. The role of each intermediate node will be merely to decide which of its neighboring nodes it should choose to adjust the increase or decrease in the flow rate of each session, which has already been triggered by the source node.

In the trucking analogy, $w_k$ is the number of trucks in the fleet that are supposed to be on the road at any given time. If there are too few trucks on the road compared to $w_k$, then the rate at which trucks leave the warehouse is increased slightly, by adding some more trucks. In that case, the new trucks are directed to travel over the path to the destination that is currently least congested. If there are too many trucks on the road, then the rate at which trucks can leave the warehouse must be decreased by removing trucks from service. In that case, the trucks that are removed are the ones that are traveling over the path to the destination that is currently most congested. As the number of trucks is continually adjusted over time by adding and removing trucks in response to congestion, the route(s) that the trucks follow gradually become optimized.

In view of the exemplary systems shown and described above, methodologies that may be implemented in accordance with the embodiments will be better appreciated with reference to the flow charts of FIGS. 5-8. While, for purposes of simplicity of explanation, the methodologies are shown and described as a series of blocks, it is to be understood and appreciated that the embodiments are not limited by the order of the blocks, as some blocks may, in accordance with an embodiment, occur in different orders and/or concurrently with other blocks from that shown and described herein. Moreover, not all illustrated blocks may be required to implement the methodologies in accordance with the embodiments.

The embodiments may be described in the general context of computer-executable instructions, such as program modules, executed by one or more components. Generally, program modules include routines, programs, objects, data structures, etc., that perform particular tasks or implement particular abstract data types. Typically, the functionality of the program modules may be combined or distributed as desired in various instances of the embodiments.

Figure 5:
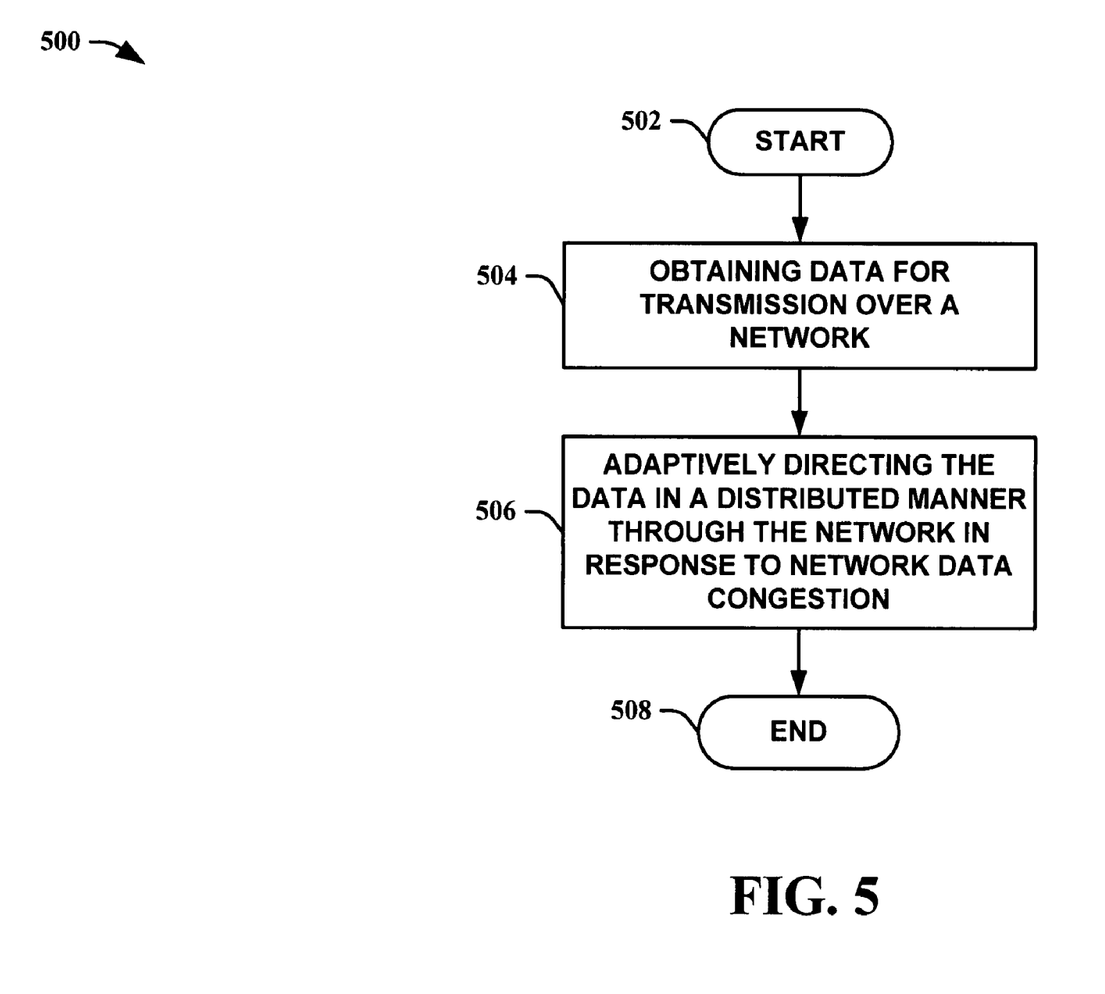
FIG. 5 is a flow diagram of a method of facilitating network data routing in accordance with an aspect of an embodiment.

In FIG. 5, a flow diagram of a method 500 of facilitating network data routing in accordance with an aspect of an embodiment is shown. The method 500 starts 502 by obtaining data for transmission over a network 504. The data can be obtained from an originating source and/or an intermediate node on a network that is relaying the data and the like. The data is then adaptively directed in a distributed manner through the network in response to network data congestion 506, ending the flow 508. The adaptation can be determined based on data transmission cost methods that include, at least in part, data congestion. The data transmission costs for a given node are stored locally to facilitate neighboring nodes in determining an adaptation at the node level (decisions for routing are, thus, "distributed" to nodes of the network rather than from a centralized authority or fixed data routing table). This allows for continuous adaptations without a centralized body determining data congestion points.

Figure 6:
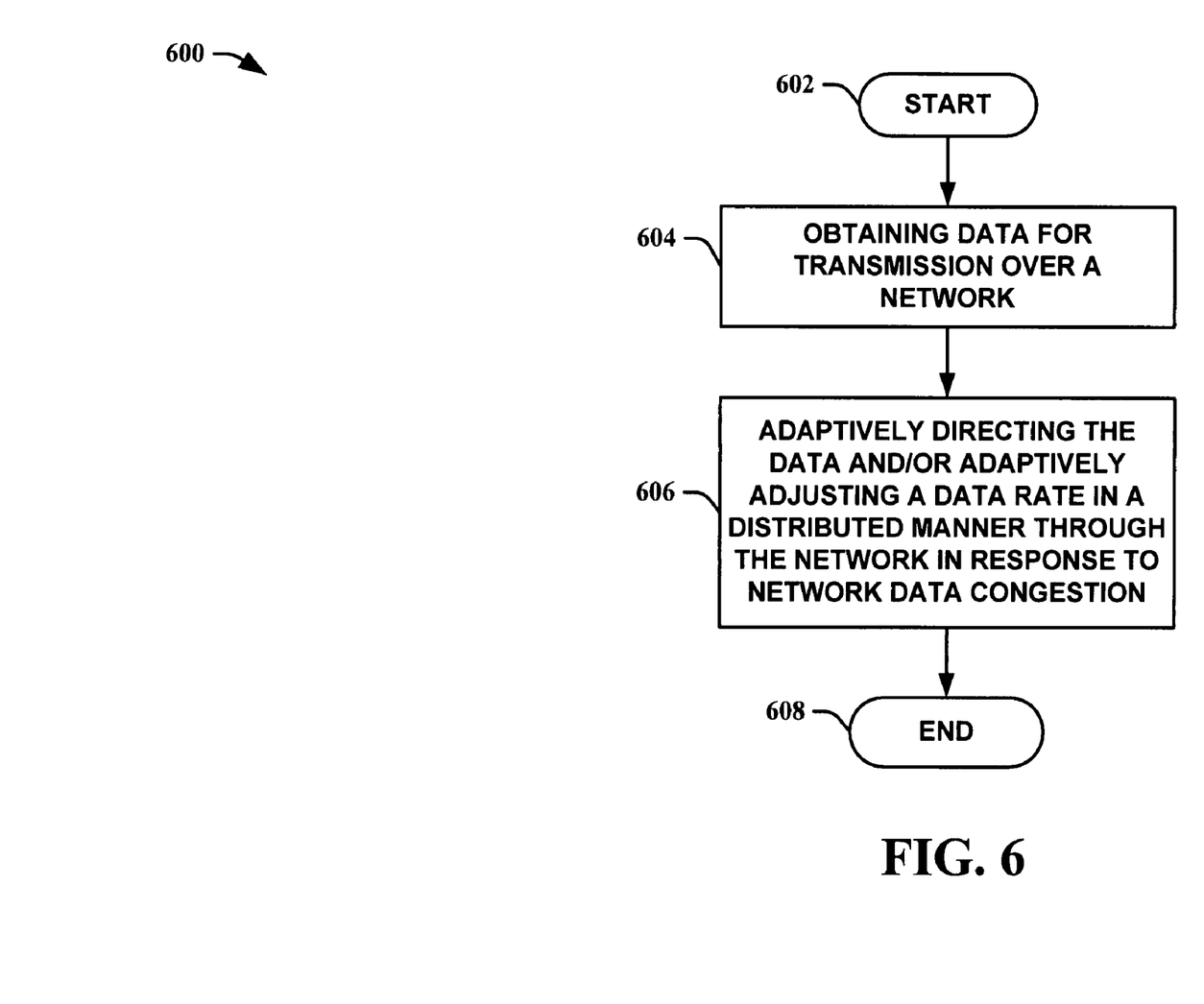
FIG. 6 is another flow diagram of a method of facilitating network data routing in accordance with an aspect of an embodiment.

Referring to FIG. 6, another flow diagram of a method 600 of facilitating network data routing in accordance with an aspect of an embodiment is depicted. The method 600 starts 602 by obtaining data for transmission over a network 604. The data can be obtained from an originating source and/or an intermediate node on a network that is relaying the data and the like. The data is adaptively directed and/or a data rate is adaptively adjusted in a distributed manner through the network in response to network data congestion 606, ending the flow 608. Adapting data routes and rates permits maximization of network resources and network data throughput in light of data transmission congestion. Thus, the routing and/or rate adaptation decision is passed to each node that encounters the transmitted data, distributing the decision across the transmitting nodes of the network. The method 600 allows both route and rate adaptations to take advantage of cost efficiencies gained through rate changes in conjunction with route changes.

Figure 7:
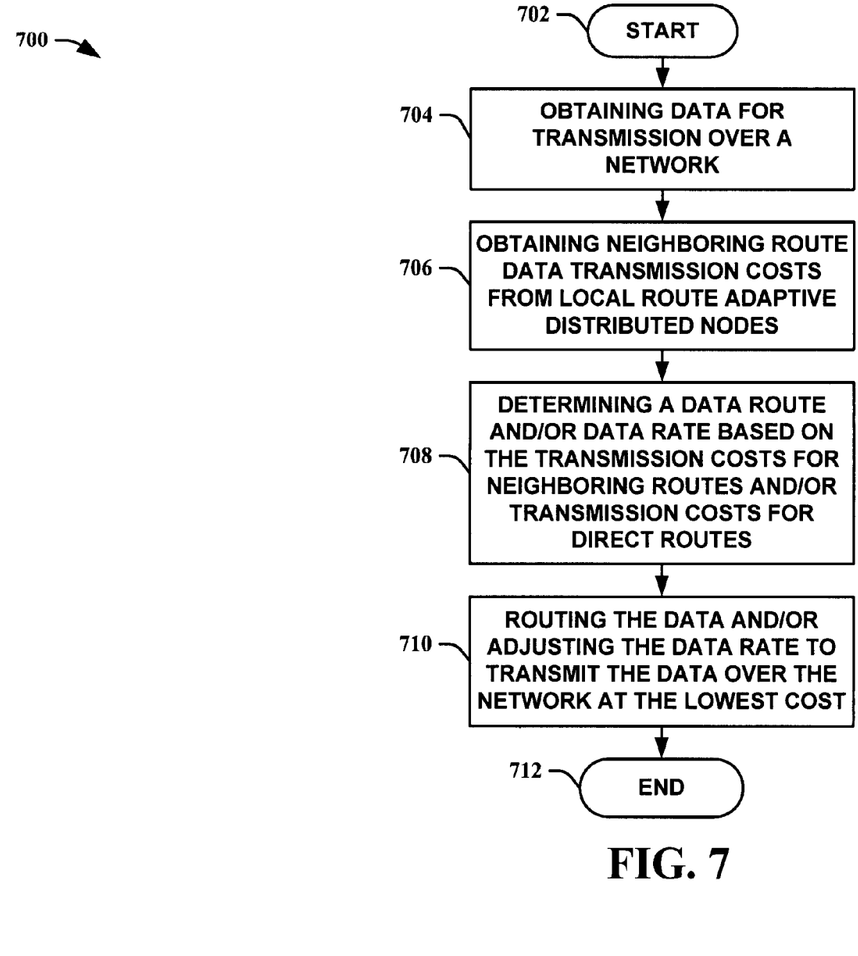
FIG. 7 is yet another flow diagram of a method of facilitating network data routing in accordance with an aspect of an embodiment.

Looking at FIG. 7, yet another flow diagram of a method 700 of facilitating network data routing in accordance with an aspect of an embodiment is illustrated. The method 700 starts 702 by obtaining data for transmission over a network 704. The data can be obtained from an originating source and/or an intermediate node on a network that is relaying the data and the like. Neighboring route data transmission costs are obtained from local route adaptive distributed nodes 706. The data transmission costs can be obtained through polling and/or broadcasting methods. The local route adaptive distributed nodes typically store minimum, average, and/or maximum cost information for their links/paths. A data route and/or data rate is then determined based on the transmission costs for neighboring routes and/or transmission costs for direct routes 708. Although any rate update equation can suffice, an example process that attempts to maintain each session's budget is provided using Eq. 10 and Eq. 11 supra. The data is routed and/or the data rate is adjusted to transmit the data over the network at the lowest cost 710, ending the flow 712. By utilizing localized information, congestion can be more easily negotiated to optimize data throughput without end-to-end a priori knowledge of its existence. Distribution also facilitates reducing the complexity by eliminating reporting back to a centralized routing control entity.

Figure 8:
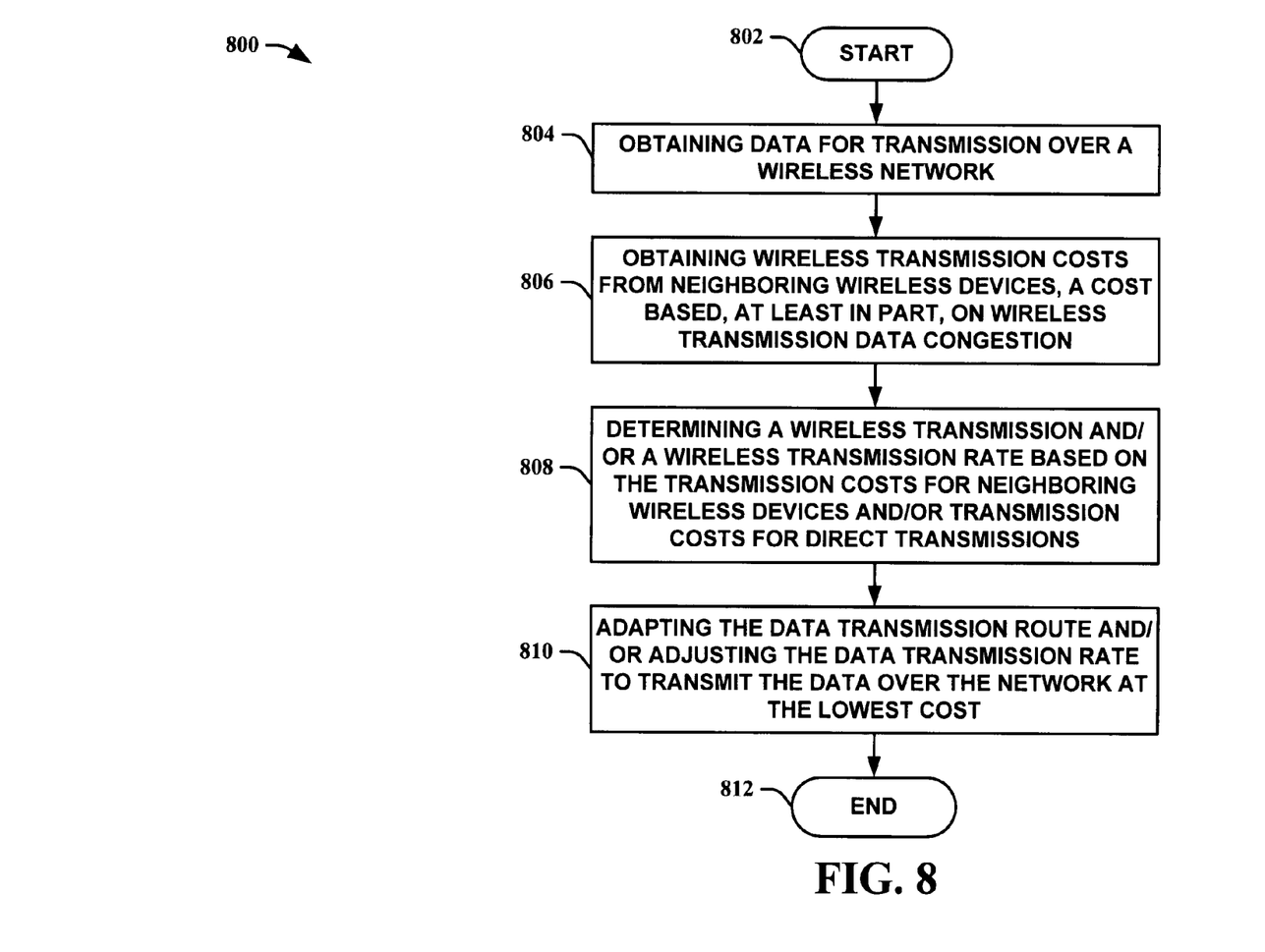
FIG. 8 is a flow diagram of a method of facilitating wireless network data transmission routing in accordance with an aspect of an embodiment.

Turning to FIG. 8, a flow diagram of a method 800 of facilitating wireless network data transmission routing in accordance with an aspect of an embodiment is shown. The method 800 starts 802 by obtaining data for transmission over a wireless network 804. The data can be obtained from an originating source and/or an intermediate wireless device on the wireless network that is relaying the data and the like. Wireless transmission costs are obtained from neighboring wireless devices where a cost is based, at least in part, on wireless transmission data congestion 806. Wireless devices can store minimum, average, and/or maximum cost information for various data transmissions available to them. A wireless transmission and/or a wireless transmission rate is then determined based on the transmission costs for neighboring wireless devices and/or transmission costs for direct transmissions 808. The data transmission route is then adapted and/or the data transmission rate is adjusted to transmit the data over the network at the lowest cost 810, ending the flow 812. This allows for relayed communications of data over devices such as, for example, walkie-talkies, cellular radios, and other short range communication devices that often cannot accomplish long distance end-to-end communications, thus, extending their usefulness. However, even long range communications devices can employ method 800 to extend their range (e.g., satellite signal propagation to reach global areas and avoid satellite communication congestion, etc.). The devices themselves can be modified to relay data without interfering with normal operations of the device (e.g., background processing, background transmission of congestion information to local devices, etc.).

Figure 9:
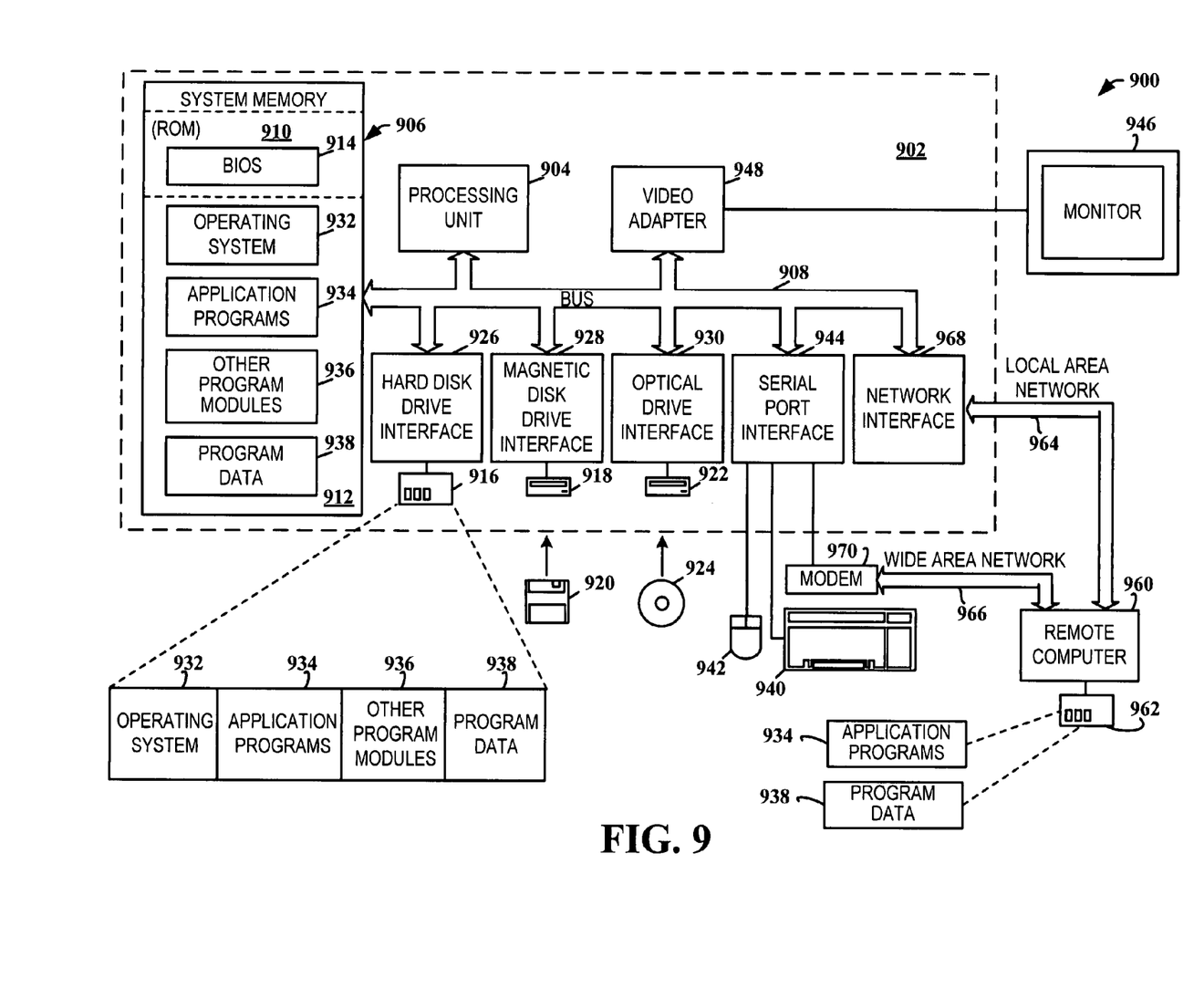
FIG. 9 illustrates an example operating environment in which an embodiment can function.

In order to provide additional context for implementing various aspects of the embodiments, FIG. 9 and the following discussion is intended to provide a brief, general description of a suitable computing environment 900 in which the various aspects of the embodiments can be performed. While the high level embodiments have been described above in the general context of computer-executable instructions of a computer program that runs on a local computer and/or remote computer, those skilled in the art will recognize that the embodiments can also be performed in combination with other program modules. Generally, program modules include routines, programs, components, data structures, etc., that perform particular tasks and/or implement particular abstract data types. Moreover, those skilled in the art will appreciate that the inventive methods can be practiced with other computer system configurations, including single-processor or multi-processor computer systems, minicomputers, mainframe computers, as well as personal computers, routers, hand-held computing devices, microprocessor-based and/or programmable consumer electronics, and the like, each of which can operatively communicate with one or more associated devices. The illustrated aspects of the embodiments can also be practiced in distributed computing environments where certain tasks are performed by remote processing devices that are linked through a communications network. However, some, if not all, aspects of the embodiments can be practiced on stand-alone computers and/or stand-alone devices. In a distributed computing environment, program modules can be located in local and/or remote memory storage devices.

With reference to FIG. 9, an exemplary system environment 900 for performing the various aspects of the high level embodiments include a conventional computer 902, including a processing unit 904, a system memory 906, and a system bus 908 that couples various system components, including the system memory, to the processing unit 904. The processing unit 904 can be any commercially available or proprietary processor. In addition, the processing unit can be implemented as multi-processor formed of more than one processor, such as can be connected in parallel.

The system bus 908 can be any of several types of bus structure including a memory bus or memory controller, a peripheral bus, and a local bus using any of a variety of conventional bus architectures such as PCI, VESA, Microchannel, ISA, and EISA, to name a few. The system memory 906 includes read only memory (ROM) 910 and random access memory (RAM) 912. A basic input/output system (BIOS) 914, containing the basic routines that help to transfer information between elements within the computer 902, such as during start-up, is stored in ROM 910.

The computer 902 also can include, for example, a hard disk drive 916, a magnetic disk drive 918, e.g., to read from or write to a removable disk 920, and an optical disk drive 922, e.g., for reading from or writing to a CD-ROM disk 924 or other optical media. The hard disk drive 916, magnetic disk drive 918, and optical disk drive 922 are connected to the system bus 908 by a hard disk drive interface 926, a magnetic disk drive interface 928, and an optical drive interface 930, respectively. The drives 916-922 and their associated computer-readable media provide nonvolatile storage of data, data structures, computer-executable instructions, etc. for the computer 902. Although the description of computer-readable media above refers to a hard disk, a removable magnetic disk and a CD, it should be appreciated by those skilled in the art that other types of media which are readable by a computer, such as magnetic cassettes, flash memory, digital video disks, Bernoulli cartridges, and the like, can also be used in the exemplary operating environment 900, and further that any such media can contain computer-executable instructions for performing the methods of the embodiments.

A number of program modules can be stored in the drives 916-922 and RAM 912, including an operating system 932, one or more application programs 934, other program modules 936, and program data 938. The operating system 932 can be any suitable operating system or combination of operating systems. By way of example, the application programs 934 and program modules 936 can include a congestion adaptive data routing scheme in accordance with an aspect of an embodiment.

A user can enter commands and information into the computer 902 through one or more user input devices, such as a keyboard 940 and a pointing device (e.g., a mouse 942). Other input devices (not shown) can include a microphone, a joystick, a game pad, a satellite dish, a wireless remote, a scanner, or the like. These and other input devices are often connected to the processing unit 904 through a serial port interface 944 that is coupled to the system bus 908, but can be connected by other interfaces, such as a parallel port, a game port or a universal serial bus (USB). A monitor 946 or other type of display device is also connected to the system bus 908 via an interface, such as a video adapter 948. In addition to the monitor 946, the computer 902 can include other peripheral output devices (not shown), such as speakers, printers, etc.

It is to be appreciated that the computer 902 can operate in a networked environment using logical connections to one or more remote computers 960. The remote computer 960 can be a workstation, a server computer, a router, a peer device or other common network node, and typically includes many or all of the elements described relative to the computer 902, although for purposes of brevity, only a memory storage device 962 is illustrated in FIG. 9. The logical connections depicted in FIG. 9 can include a local area network (LAN) 964 and a wide area network (WAN) 966. Such networking environments are commonplace in offices, enterprise-wide computer networks, intranets and the Internet.

When used in a LAN networking environment, for example, the computer 902 is connected to the local network 964 through a network interface or adapter 968. When used in a WAN networking environment, the computer 902 typically includes a modem (e.g., telephone, DSL, cable, etc.) 970, or is connected to a communications server on the LAN, or has other means for establishing communications over the WAN 966, such as the Internet. The modem 970, which can be internal or external relative to the computer 902, is connected to the system bus 908 via the serial port interface 944. In a networked environment, program modules (including application programs 934) and/or program data 938 can be stored in the remote memory storage device 962. It will be appreciated that the network connections shown are exemplary and other means (e.g., wired or wireless) of establishing a communications link between the computers 902 and 960 can be used when carrying out an aspect of an embodiment.

In accordance with the practices of persons skilled in the art of computer programming, the embodiments have been described with reference to acts and symbolic representations of operations that are performed by a computer, such as the computer 902 or remote computer 960, unless otherwise indicated. Such acts and operations are sometimes referred to as being computer-executed. It will be appreciated that the acts and symbolically represented operations include the manipulation by the processing unit 904 of electrical signals representing data bits which causes a resulting transformation or reduction of the electrical signal representation, and the maintenance of data bits at memory locations in the memory system (including the system memory 906, hard drive 916, floppy disks 920, CD-ROM 924, and remote memory 962) to thereby reconfigure or otherwise alter the computer system's operation, as well as other processing of signals. The memory locations where such data bits are maintained are physical locations that have particular electrical, magnetic, or optical properties corresponding to the data bits.

Figure 10:
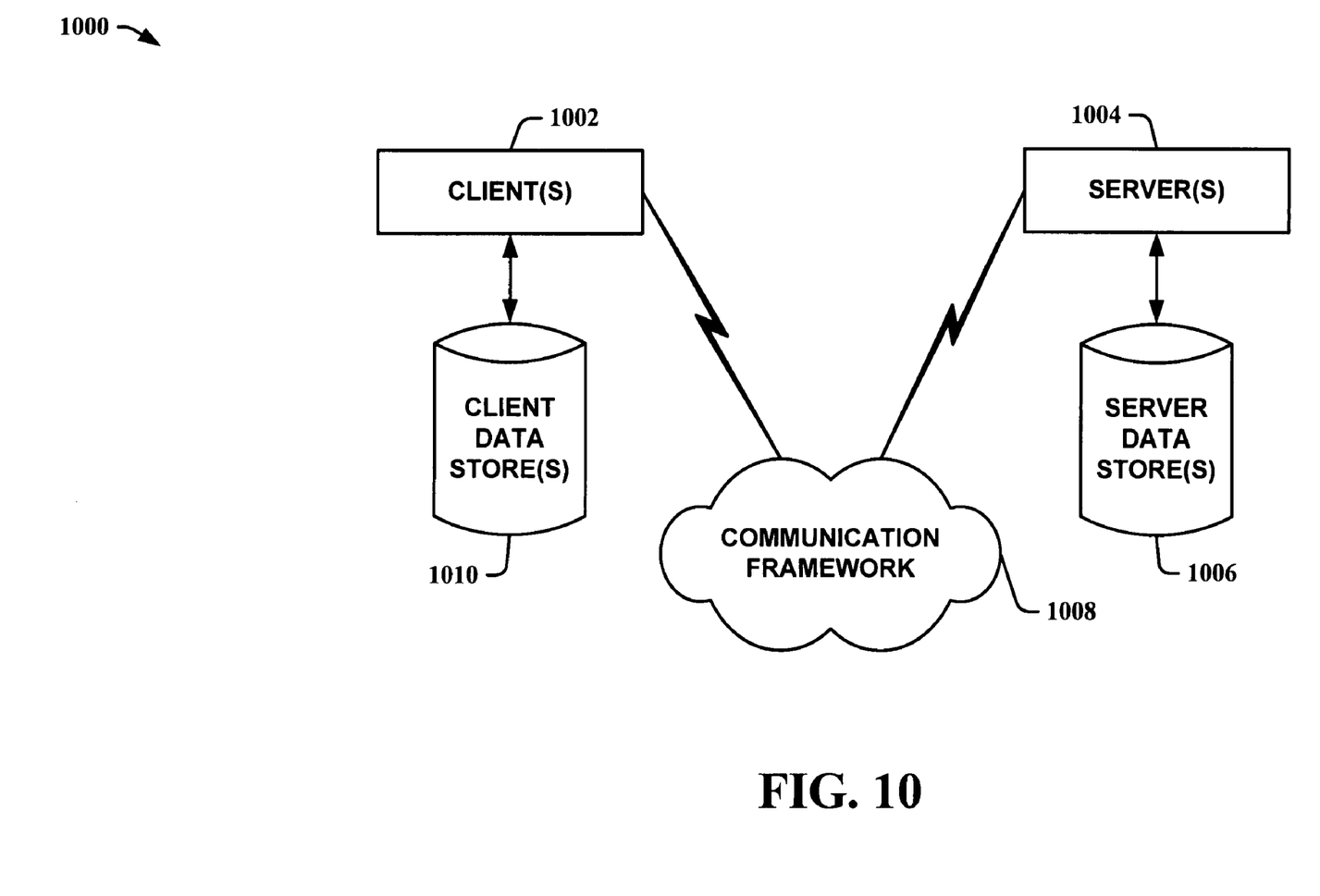
FIG. 10 illustrates another example operating environment in which an embodiment can function.

FIG. 10 is another block diagram of a sample computing environment 1000 with which embodiments can interact. The system 1000 further illustrates a system that includes one or more client(s) 1002. The client(s) 1002 can be hardware and/or software (e.g., threads, processes, computing devices). The system 1000 also includes one or more server(s) 1004. The server(s) 1004 can also be hardware andlor software (e.g., threads, processes, computing devices). One possible communication between a client 1002 and a server 1004 can be in the form of a data packet adapted to be transmitted between two or more computer processes. The system 1000 includes a communication framework 1008 that can be employed to facilitate communications between the client(s) 1002 and the server(s) 1004. The client(s) 1002 are connected to one or more client data store(s) 1010 that can be employed to store information local to the client(s) 1002. Similarly, the server(s) 1004 are connected to one or more server data store(s) 1006 that can be employed to store information local to the server(s) 1004.

It is to be appreciated that the systems and/or methods of the embodiments can be utilized in congestion adaptive data routing facilitating computer components and non-computer related components alike. Further, those skilled in the art will recognize that the systems and/or methods of the embodiments are employable in a vast array of electronic related technologies, including, but not limited to, computers, servers and/or handheld electronic devices, and the like.

What has been described above includes examples of the embodiments. It is, of course, not possible to describe every conceivable combination of components or methodologies for purposes of describing the embodiments, but one of ordinary skill in the art may recognize that many further combinations and permutations of the embodiments are possible. Accordingly, the subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates network data routing, comprising:
   a receiving component configured to:
      obtain a set of source data for transmitting over a network to a target node, and
      receive a set of congestion data from each of a plurality of neighboring nodes, each of the plurality of neighboring nodes directly neighboring the receiving component such that no nodes are between the receiving component and any of the plurality of neighboring nodes, the received set of congestion data corresponding to a cost for transmitting the set of source data via each of the respective plurality of neighboring nodes to the target node;
   a memory component configured to store the received set of congestion data, the set of congestion data stored prior to any request for the received congestion data from a requesting node; and
   an adaptive routing component configured to:
      dynamically route the set of source data to one of the plurality of neighboring nodes, the one of the plurality of neighboring nodes selected as a function of the received set of congestion data:
      perform at least one of either increase a data rate via a lowest cost network path, or decrease a data rate via a highest cost network path; and
      determine when $$w_k > \sum_j (p_{ij} + avg p_j^k) r_{ij}^k$$

and then increase a rate of flow to a lowest cost neighbor $j^* = \arg\min_j p_j^k$:

$$r_{ij^*}^k(t+\Delta) = r_{ij^*}^k(t) + \max\left\{M, \frac{w_k - \sum_j (p_{ij} + avg p_j^k) r_{ij}^k(t)}{(p_{ij^*} + \min p_{j^*}^k)}\right\}, \quad \text{(Eq. 10)}$$

where $w_k$ is a cost budget for a session k, $p_{ij}$ is a price per unit flow of a link carrying data from node to node i to node j, $r_{ij}^k$ is the rate of flow on a link carrying data from node i to node j for session k, and M is a maximum allowable increase in the rate of flow.

2. The system of claim 1, in which the adaptive routing component determines when $$w_k \leq \sum_j (p_{ij} + avg p_j^k) r_{ij}^k$$

and then decreases a rate of flow to a costliest neighbor $j^* = \arg\max_j p_j^k$:

$$r_{ij^*}^k(t+\Delta) = r_{ij^*}^k(t) - \min\left\{r_{ij}^k(t), \frac{\sum_j (p_{ij} + avg p_j^k) r_{ij}^k(t) - w_k}{(p_{ij^*} + \max p_{j^*}^k)}\right\}, \quad \text{(Eq. 11)}$$

where $w_k$ is a cost budget for a session k, $p_{ij}$ is a price per unit flow of a link carrying data from node i to node j, and $r_{ij}^k$ is the rate of flow on a link carrying data from node i to node j for session k.

3. The system of claim 1, in which the adaptive routing component is configured to utilize the received congestion data to facilitate rate control for each session.

4. The system of claim 3, in which the plurality of neighboring nodes maintain at least one of a minimum cost, maximum cost, or average cost for routing of the set of source data via each of the respective plurality of neighboring nodes to the target node.

5. The system of claim 4, in which the plurality of neighboring nodes employ at least one of a minimum cost, maximum cost, or average cost technique that utilize at least one of:

$$\min p_i^k = \min_j \{p_{ij} + \min p_j^k\}, \quad \text{(Eq. 7)}$$

$$avg p_i^k = \sum_j (p_{ij} + avg p_j^k) r_{ij}^k \Big/ \sum_j r_{ij}^k, \text{ and/or} \quad \text{(Eq. 8)}$$

$$\max p_i^k = \max_j \{p_{ij} + \max p_j^k\}. \quad \text{(Eq. 9)}$$

6. A wireless network that employs the system of claim 1 to facilitate transmitting wireless data over the wireless network.

7. The system of claim 1, in which the adaptive routing component resides on one of either a physical network node or a logical network node.

8. A device employing the system of claim 1 comprising at least one selected from the group consisting of a computer, a server, and a handheld electronic device.

9. A method for facilitating network data routing, comprising:
   obtaining a set of source data for transmitting over a network to a target node from a routing component;
   receiving a set of congestion data from each of a plurality of neighboring nodes, each of the plurality of neighboring nodes directly neighboring the routing component such that no nodes are between the routing component and any of the plurality of neighboring nodes, the received set of congestion data corresponding to a cost for transmitting the set of source data via each of the respective plurality of neighboring nodes to the target node;
   storing the received set of congestion data, the received set of congestion data stored prior to any request for the received congestion data from a requesting node;
   adaptively routing the set of source data to one of the plurality of neighboring nodes, the one of the plurality of neighboring nodes selected as a function of the received set of congestion data;
   altering data transmission rates in response to the received congestion data;
   performing one of either increasing a data rate via a lowest cost network path or decreasing a data rate via a highest cost network path; and
   determining when $$w_k > \sum_j (p_{ij} + avg p_j^k) r_{ij}^k$$

and then increasing a rate of flow to a lowest cost neighbor j*=arg min$_j$ p$_j^k$:

$$r_{ij*}^k(t+\Delta) = r_{ij*}^k(t) + \max\left\{M, \frac{w_k - \sum_j (p_{ij} + avg p_j^k) r_{ij}^k(t)}{(p_{ij*} + \min p_{j*}^k)}\right\}, \quad \text{(Eq. 10)}$$

where $w_k$ is a cost budget for a session k, $p_{ij}$ is a price per unit flow of a link carrying data from node i to node j, $r_{ij}^k$ is the rate of flow on a link carrying data from node i to node j for session k, and M is a maximum allowable increase in the rate of flow.

10. The method of claim 9 further comprising: retrieving transmission cost information from the plurality of neighboring nodes to facilitate determining an optimal transmission link.

11. The method of claim 9 further comprising:
determining when $$w_k \leq \sum_j (p_{ij} + avg p_j^k) r_{ij}^k$$

and then decreasing a rate of flow to a highest cost neighbor j*=arg max$_j$ p$_j^k$:

$$r_{ij*}^k(t+\Delta) = r_{ij*}^k(t) - \min\left\{r_{ij}^k(t), \frac{\sum_j (p_{ij} + avg p_j^k) r_{ij}^k(t) - w_k}{(p_{ij*} + \max p_{j*}^k)}\right\}, \quad \text{(Eq. 11)}$$

where $w_k$ is a cost budget for a session k, $p_{ij}$ is a cost per unit flow of a link carrying data from node i to node j, and $r_{ij}^k$ is the rate of flow on a link carrying data from node i to node j for session k.

12. The method of claim 9 further comprising:
determining at least one of a data route or a data rate based on at least one of data transmission costs for neighboring routes or data transmission costs for direct routes; and
at least one of routing data or adjusting data transmission rates to transmit data over the network at a lowest cost, the cost based on, at least in part, the received congestion data.

13. A device employing the method of claim 9 comprising at least one selected from the group consisting of a computer, a server, and a handheld electronic device.

14. A method for facilitating network data routing, comprising:
obtaining a set of source data for transmitting over a wireless network to a target wireless device from a routing component;
receiving a set of congestion data from each of a plurality of neighboring wireless devices, each of the plurality of neighboring wireless devices directly neighboring the routing component such that no wireless devices are between the routing component and any of the plurality of neighboring wireless devices, the received set of congestion data corresponding to a cost for transmitting the set of source data via each of the respective plurality of neighboring wireless devices to the target wireless device;
storing the received set of congestion data, the received set of congestion data stored prior to any request for the received congestion data from a requesting wireless device;
adaptively routing the set of source data to one of the plurality of neighboring wireless devices, the one of the plurality of neighboring wireless devices selected as a function of the received set of congestion data;
altering data transmission rates in response to the received congestion data;
performing one of either increasing a data rate via a lowest cost network path or decreasing a data rate via a highest cost network path; and
determining when $$w_k > \sum_j (p_{ij} + avg p_j^k) r_{ij}^k$$

and then increasing a rate of flow to a lowest cost neighbor j*=arg min$_j$ p$_j^k$:

$$r_{ij*}^k(t+\Delta) = r_{ij*}^k(t) + \max\left\{M, \frac{w_k - \sum_j (p_{ij} + avg p_j^k) r_{ij}^k(t)}{(p_{ij*} + \min p_{j*}^k)}\right\}, \quad \text{(Eq. 10)}$$

where $w_k$ is a cost budget for a session k, $p_{ij}$ is a price per unit flow of a link carrying data from wireless device i to wireless device j, $r_{ij}^k$ is the rate of flow on a link carrying data from wireless device i to wireless device j for session k, and M is a maximum allowable increase in the rate of flow.

15. The method of claim 14 further comprising:
polling the neighboring wireless devices to obtain wireless transmission cost information for transmitting the data through the neighboring wireless devices.

16. The method of claim 14 further comprising:
determining when $$w_k \leq \sum_j (p_{ij} + avg p_j^k) r_{ij}^k$$

and then decreasing a rate of flow to a highest cost neighbor j*=arg max$_j$ p$_j^k$:

$$r_{ij*}^k(t+\Delta) = r_{ij*}^k(t) - \min\left\{r_{ij}^k(t), \frac{\sum_j (p_{ij} + avg p_j^k) r_{ij}^k(t) - w_k}{(p_{ij*} + \max p_{j*}^k)}\right\}, \quad \text{(Eq. 11)}$$

where $w_k$ is a cost budget for a session k, $p_{ij}$ is a cost per unit flow of a link carrying data from wireless device i to wireless device j, and $r_{ij}^k$ is the rate of flow on a link carrying data from wireless device i to wireless device j for session k.

* * * * *